(12) United States Patent
Hübner et al.

(10) Patent No.: US 8,256,626 B2
(45) Date of Patent: Sep. 4, 2012

(54) COMPOSITE MEMBRANE FOR THE SEPARATION OF WATER AND METHOD FOR MANUFACTURING SAME

(75) Inventors: Andreas Hübner, Unna (DE); Elena Gonzalez Diaz, Blieskastel (DE); Michael Frania, Friedrichsthal (DE)

(73) Assignee: Souzer Chemtech GmbH, Linden (DE)

( * ) Notice: Subject to any disclaimer, the term of this patent is extended or adjusted under 35 U.S.C. 154(b) by 351 days.

(21) Appl. No.: 12/586,236

(22) Filed: Sep. 18, 2009

(65) Prior Publication Data
US 2010/0084335 A1 Apr. 8, 2010

(30) Foreign Application Priority Data

Oct. 2, 2008 (EP) .................................. 08165680

(51) Int. Cl.
*B01D 71/38* (2006.01)
*B01D 61/00* (2006.01)
(52) U.S. Cl. .............. 210/500.42; 210/500.21; 210/640; 210/650; 427/246; 427/384; 427/385.5

(58) Field of Classification Search ........................ None
See application file for complete search history.

(56) References Cited

U.S. PATENT DOCUMENTS

| 4,941,976 A | * | 7/1990 | Bartels et al. ................. 210/490 |
| 4,961,855 A | * | 10/1990 | Reale et al. .................... 210/640 |
| 5,141,649 A | * | 8/1992 | Pasternak et al. ............. 210/640 |
| 5,171,449 A | * | 12/1992 | Pasternak et al. ............. 210/640 |
| 5,281,337 A | * | 1/1994 | Chou et al. .................... 210/654 |
| 5,334,314 A | * | 8/1994 | Neel et al. ..................... 210/640 |

FOREIGN PATENT DOCUMENTS

| DE | 10 2004 06085 A1 | 7/2006 |
| EP | 0 307 636 A | 3/1989 |
| EP | 0 436 128 A | 7/1991 |
| EP | 0 499 728 A | 8/1992 |

* cited by examiner

*Primary Examiner* — Krishnan S Menon
(74) *Attorney, Agent, or Firm* — Francis C. Hand; Carella, Byrne et. al

(57) ABSTRACT

A composite membrane is provided for the separation of water with at least one separation layer of cross-linked polyvinyl alcohol, with the separation layer being subjected in a separate process step to a post-crosslinking operation with an acid or an acid-releasing compound and at least one dialdehyde.

20 Claims, 1 Drawing Sheet

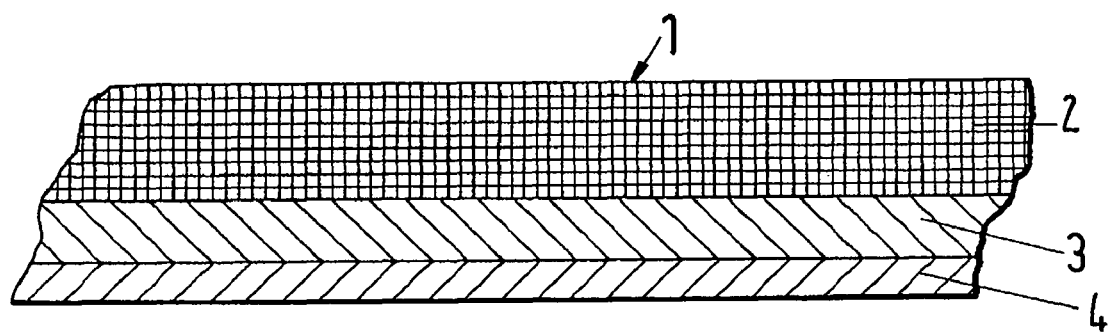

COMPOSITE MEMBRANE FOR THE SEPARATION OF WATER AND METHOD FOR MANUFACTURING SAME

This invention relates to a composite membrane for the separation of water form an aqueous mixture containing an organic compound. More particularly, this invention relates to a method of manufacturing a composite membrane for the separation of water form an aqueous mixture containing an organic compound.

It is known to use the processes of pervaporation or of vapor permeation for the separation or deposition of water from fluid mixtures which contain organic components. Membranes are known for these processes which have at least one separation layer. A composite membrane is, for example, disclosed in EP-A-0 096 339 which is made up of a carrier layer, a porous support layer and a separation layer of crosslinked polyvinyl alcohol (PVA).

A woven cloth or fleece usually serves as a carrier layer and has a high resistance with respect to chemicals and temperature. Polyester with a smooth surface on one side is a preferred material for the carrier layer. A porous support layer which has the properties of an ultrafiltration membrane is applied to the carrier layer. Porous support layers of polyacrylicnitrile (PAN) or polysulfone (PS) are preferred.

The setting of the pore size and of the pore radius distribution can take place by corresponding conditions in the manufacture of the porous support layer.

The separation layer of such membranes is made up of crosslinked polyvinyl alcohol with a high degree of saporification and a mean molecular weight between 20,000 and 200,000 Daltons. The crosslinking operation of the polyvinyl alcohol of the separation layer takes place by esterification, etherification or acetalation or by a combination of these processes. After the application of an aqueous solution of the polyvinyl alcohol and of the esterification means, the separation layer is dried, cured and crosslinked at a temperature of 120° C. to 160° C. The process of the application of the aqueous solution and of the subsequent heat treatment can take place a plurality of times, for example twice, after one another. The thickness of the separation layer typically amounts to 0.5 µm to 10 µm. Such membranes are operated at temperatures between 45° C. to 95° C.

To allow higher operating temperatures and to achieve a better resistance in particular toward bases and acids, it is known from DE-A-10 2004 060 857 to subject the separation layer of crosslinked polyvinyl alcohol to a post-crosslinking operation in a separate process step, with no acids or acid-releasing compounds being added. Even if these post-crosslinked membranes have proven themselves in practice, they are, however, subject to the limitation that the duration of the post-crosslinking operation amounts to 6 to 48 hours, with the duration of 10 to 16 hours being preferred. This long treatment time makes the manufacture protracted.

A membrane of polyvinyl alcohol is known from EP-A-0 436 128 in which the crosslinked (pre-crosslinked) membrane is post-crosslinked by the effect or acids or of acid-releasing substances which act on the PVA over the vapor phase. Higher operating temperatures can also herewith be made possible and the resistance toward acids and bases is increased. It is, however, problematic in this manufacture that the process should be carried out under reduced oxygen partial pressure in practice, which in particular gives rise to practical problems in larger productions facilities.

A method is disclosed in EP 0 307 636 for the manufacture of a composite membrane for pervaporation and vapor permeation with a separation layer of polyvinyl alcohol, with the polyvinyl alcohol being crosslinked with a dialdehyde and an acid as a catalyst. The PVA solution contains simultaneously dialdehyde and acid as a catalyst for this purpose. Such solutions are as a rule very unstable and already react at room temperature, whereby the viscosity of the solution increases. A controlled application, and in particular a machine application, of the solution is thereby hardly realizable in practice.

It has furthermore been shown that, when known composite membranes with a separation layer of crosslinked PVA are used, problems occur in the dewatering of mixtures which contain aldehydes. The selectivity of the separation layer for water has already diminished dramatically after a comparatively short operating period. The selectivity of the membrane has thus, for example, fallen from an initial 99% to 80% after an operating period of 47 hours in a mixture of ethanol/water and 1% acetaldehyde. These percentages substantially indicate the water content of the permeate.

Accordingly, it is an object of the invention to provide a composite membrane with a separation layer of polyvinyl alcohol which maintains a high selectivity and remains stable on the dewatering of mixtures containing aldehydes.

It is another object of the invention to provide a composite membrane that is operable at high operating temperatures of up to 120° C.

It is another object of the invention to provide a relatively simple method for manufacturing a composite membrane for separating water from an aqueous mixture containing an organic compound.

Briefly, the invention provides a composite membrane for the separation of water having at least one separation layer of crosslinked polyvinyl alcohol, with the separation layer being subjected in a separate process step to a post-crosslinking operation with an acid or an acid-releasing compound and at least one dialdehyde.

In particular, the composite membrane includes at least one separation layer characterized in having been pre-crosslinked with polyvinyl alcohol and thereafter separately post-crosslinked with one of an acid and an acid-releasing compound and at least one dialdehyde.

The invention also provides a method for the manufacture of a composite membrane having at least one separation layer from polyvinyl alcohol that includes application of a starting solution containing polyvinyl alcohol to a support layer; pre-crosslinking of the polyvinyl alcohol; application of a solution for the post-crosslinking of the polyvinyl alcohol, said solution containing one of an acid and an acid-releasing compound as well as at least one dialdehyde; and post-crosslinking of the separation layer.

It has surprisingly been shown that a pre-crosslinked separation layer which is manufactured in a manner known per se by esterification, etherification or acetalation of the polyvinyl alcohol or by a combination of these methods and is not yet thermally post-crosslinked leads by a post-crosslinking operation with a dialdehyde and an acid or an acid-releasing compound serving as a catalyst to a composite membrane which has a very good stability with respect to mixtures containing aldehydes at an elevated operating temperature.

The post-crosslinking operation that is provided as a separate step preferably takes place by means of an aqueous solution which contains both the acid or the acid-releasing compound and the dialdehyde. The acid-dialdehyde solution is very stable in this connection since the solution does not contain any polyvinyl alcohol.

The post-crosslinking operation advantageously takes place at an elevated temperature which is preferably in the range from 150° C. to 220° C. and particularly preferably from 160° C. to 200° C.

The duration of the post-crosslinking operation is in particular between 1 and 30 minutes, preferably between 5 and 15 minutes.

The post-crosslinking operation preferably takes place by means of a solution in which the dialdehyde is contained in quantities between 1% and 30%, preferably between 5% and 10%.

Glutaric dialdehyde is, in particular, suitable as the dialdehyde.

With respect to the acid content for the post-crosslinking operation, it has proven successful if the post-crosslinking operation takes place by means of a solution in which the acid is contained in quantities from 0.1% to 1%, preferably from 0.3% to 0.6%.

A preferred acid for the post-crosslinking operation is sulfuric acid.

It is furthermore advantageous if the post-crosslinking operation takes place by means of an aqueous solution which contains water in quantities from 70% to 95%, preferably from 85% to 95%.

The solution for the post-crosslinking operation can contain up to 30% alcohol, preferably from 5% to 15% alcohol, with the alcohol preferably being ethanol.

In a particularly preferred embodiment, the post-crosslinking operation takes place using an aqueous solution containing at least one alcohol, with the water-alcohol mixture serving as the solvent for the dialdehyde and the acid.

A particularly preferred use of the composite membrane in accordance with the invention is that for the separation of water from fluid mixtures which contain organic components by means of pervaporation or vapor permeation.

It is advantageous with respect to the crosslinking of the PVA, if the starting solution contains at least one dicarboxylic acid and, in particular, a dicarboxylic acid without a double bond and a dicarboxylic acid with a double bond.

These and other objects and advantages of the invention will become more apparent from the following detailed description taken in conjunction with the accompanying drawings in which:

FIG. 1 is a schematic sectional representation of an embodiment of a composite membrane in accordance with the invention.

Referring to FIG. 1, the composite membrane 1 has a carrier layer 2 on which a porous support layer 3 is applied and a separation layer of polyvinyl alcohol (PVA) provided on the support layer 3 on a side opposite the carrier layer 2.

The carrier layer 2 is made up in a known manner from a woven cloth or from a fleece or from a porous ceramic material. All materials of sufficient resistance with respect to the operating temperature to be expected or aimed for and to the chemicals present in the fluid to be separated can be used as the material for the support layer 2. The preferred material for the carrier layer 2 is polyester with a smooth surface on one side. Further suitable materials for the cloth or for the fleece are, for example, polyphenyl sulfide, polyamide and polyvinylidene difluoride. Glass fibers or carbon fibers, metals or ceramic materials are preferred as the inorganic materials.

The porous support layer 3 is applied to the carrier layer 2 in a manner known per se with a pore width which is as uniform as possible. Polyacrylicnitrile (PAN), polysulfone (PS), polyether sulfone and polyether etherketone are preferred among the polymers as materials for the porous support layer. If the carrier layer 2 is made of ceramic material, the porous support layer 3 is preferably made of ceramic material. The porous support layer 3 has the properties of an ultrafiltration membrane.

The separation layer 4 is formed from crosslinked polyvinyl alcohol which is preferably applied to the surface of the support layer 3 from an aqueous starting solution. The starting solution contains crosslinking means which crosslink the polyvinyl alcohol by etherification, esterification or acetalation or by a combination of these three processes and also make the polyvinyl alcohol insoluble in boiling water. Acid can be added to accelerate the crosslinking operation. In particular, formaldehyde and dicarboxylic acids (biacids) are suitable as crosslinking agents. It is particularly advantageous if the starting solution contains a dicarboxylic acid without a double bond, e.g. malonic acid, as well as a dicarboxylic group with a double bond, e.g. maleic acid.

The separation layer 4 can be applied in one work step or in a plurality of work steps. The separation layer 4 is dried and crosslinked after every application, which advantageously takes place at temperatures between 80° C. and 190° C. over a time period of 3 minutes up to one hour. Temperatures from 150° C. to 160° C. with a duration of six minutes have proven to be particularly advantageous.

The separation layer 4 prepared in this manner is called a "separation layer of pre-crosslinked polyvinyl alcohol". In accordance with the invention, a post-crosslinking operation now takes place in a separate method step using an acid or an acid-releasing compound and at least one dialdehyde.

In a preferred embodiment, the acid/acid-releasing compound and the dialdehyde are applied to the separation layer 4 of pre-crosslinked polyvinyl alcohol in an aqueous solution for the post-crosslinking operation. The acid serves as a catalyst in the post-crosslinking operation. This solution for post-crosslinking, which contains the acid/acid-releasing compound as well as the dialdehyde, is very stable because it does not contain any PVA. The post-crosslinking operation takes place at an elevated temperature of 120° C. up to 220° C., preferably at least 150° C. and particularly preferably at a temperature in the range from 160° C. up to 200° C. The duration of the post-crosslinking operation amounts to between one minute and 30 minutes.

It has been shown that separation layers 4 of PVA post-crosslinked in this manner maintain their high selectivity and remain stable. This also, in particular, applies when the fluid mixture which acts on the composite membrane 1 for the purpose of separation from water contains aldehydes, in particular acetaldehyde.

Generally all substances are suitable as the dialdehyde for the post-crosslinking operation which have two functional groups which can each react with an OH group. Glutaric dialdehyde is preferably used as the dialdehyde. Malonic dialdehyde or other water-soluble dialdehydes are likewise suitable. The quantity of dialdehyde in the aqueous solution for the post-crosslinking operation preferably amounts to 1% to 30%.

A mixture of water (100%-70%) and alcohols such as ethanol, isopropanol, butanol, ethylene glycol and glycerin is preferably used as the solvent for the dialdehyde or the dialdehydes as well as for the acid(s)/acid-releasing compound(s).

Suitable acids for the post-crosslinking operation are, in particular, sulfuric acid, hydrochloric acid, hydrobromic acid, phosphoric acid, with the preferred acid being sulfuric acid.

The following examples are provided to further explain the invention.

EXAMPLE 1

A support layer 3 which is made as a PAN ultrafiltration membrane and which is provided on the carrier layer 2 was coated with a 5% PVA solution in accordance with the prior art and pre-crosslinked at 150° C. during a period of six minutes. The separation layer 4 was then coated with a solution for post-crosslinking with 0.3% sulfuric acid, 5% glutaric dialdehyde and 24.7% ethanol and 70% water and was crosslinked at 160° C. over a period of ten minutes. The composite membrane was measured with a mixture of 10% water and 90% ethanol by means of pervaporation at 105° C.

A flow of 1.4 kg/m² h was measured and 99% water was found in the permeate. 1% acetaldehyde was then added to the water/ethanol mixture and the membrane was subjected to an endurance test at 105° C. A flow of 1.7 kg/m² h was measured and 95% water was found in the permeate after 120 hours operating time.

EXAMPLE 2

A support layer 3 which is made as a PAN ultrafiltration membrane and which is provided on the carrier layer 2 was coated twice with a 3% PVA solution in accordance with the prior art. After the first coating, a pre-crosslinking operation took place at 150° C. over a time period of six minutes. After the second coating, a pre-crosslinking operation took place at 160° C. over a time period of six minutes. The pre-crosslinked separation layer 4 was then coated with a post-crosslinking solution with 0.5% sulfuric acid, 10% glutaric dialdehyde and 89.5% water and was post-crosslinked at 180° C. for five minutes.

The composite membrane was measured with a mixture of 10% water and 90% ethanol by means of pervaporation at 105° C.

A flow of 1.1 kg/m² h was measured and 99.0% water was found in the permeate. 1% acetaldehyde was then added to the water/ethanol mixture and the membrane was subjected to an endurance test at 105° C. A flow of 1.4 kg/m² h was measured and 97% water was found in the permeate after 120 hours operating time.

The invention thus provides a composite membrane with a separation layer of polyvinyl alcohol which maintains a high selectivity and remains stable on the dewatering of mixtures containing aldehydes. The invention further provides a composite membrane that is operable at high operating temperatures of up to 120° C.

The invention also provides a relatively simple method for manufacturing a composite membrane for separating water from an aqueous mixture containing an organic compound.

What is claimed is:

1. A method of making a composite membrane for the separation of water from an aqueous mixture containing an organic component, said method comprising the steps of
    applying a porous support layer onto a carrier layer of porous material;
    thereafter applying an aqueous starting solution containing polyvinyl alcohol and cross-linking means to said support layer;
    cross-linking the polyvinyl alcohol to said support layer to form a separation layer of pre-crosslinked polyvinyl alcohol thereon;
    thereafter applying one of an acid and an acid-releasing compound and at least one dialdehyde to said separation layer; and
    crosslinking the polyvinyl in said separation layer with said dialdehyde to form a separation layer of post-crosslinked polyvinyl alcohol on said support layer.

2. A method as set forth in claim 1 wherein said step of crosslinking the polyvinyl in said separation layer with said dialdehyde takes place at an elevated temperature in a range from 150° C. to 220° C.

3. A method as set forth in claim 1 wherein said step of crosslinking the polyvinyl in said separation layer with said dialdehyde takes place at an elevated temperature in a range from 160° C. to 200° C.

4. A method as set forth in claim 1 wherein said step of crosslinking the polyvinyl in said separation layer with said dialdehyde is performed over a time of from 1 to 30 minutes.

5. A method as set forth in claim 1 wherein said step of crosslinking the polyvinyl in said separation layer with said dialdehyde is performed over a time of from 5 to 15 minutes.

6. A method as set forth in claim 1 wherein said dialdehyde is applied in a solution containing between 1% and 30% of dialdehyde.

7. A method as set forth in claim 1 wherein said dialdehyde is applied in a solution containing between 5% and 10% of dialdehyde.

8. A method as set forth in claim 1 wherein said dialdehyde is glutaric dialdehyde.

9. A method as set forth in claim 1 wherein said acid is applied in a solution containing between 0.1% and 1% acid.

10. A method as set forth in claim 1 wherein said acid is applied in a solution containing between 0.3% and 0.6% acid.

11. A method as set forth in claim 1 wherein said acid is sulfuric acid.

12. A method as set forth in claim 1 wherein said one of an acid and an acid-releasing compound and at least one dialdehyde is applied in a solution containing water in an amount of from 70% to 95%.

13. A method as set forth in claim 1 wherein said one of an acid and an acid-releasing compound and at least one dialdehyde is applied in a solution containing water in an amount of from 85% to 95%.

14. A method as set forth in claim 1 wherein said one of an acid and an acid-releasing compound and at least one dialdehyde is applied in a solution containing ethanol in an amount up to 30%.

15. A method as set forth in claim 1 wherein said one of an acid and an acid-releasing compound and at least one dialdehyde is applied in a solution containing ethanol in an amount of from 5 to 15%.

16. A method for the manufacture of a composite membrane having at least one separation layer including the steps of
    application of a starting solution containing polyvinyl alcohol to a support layer;
    pre-crosslinking of the polyvinyl alcohol to form a separation layer of pre-crosslinked polyvinyl alcohol;
    application of a solution containing one of an acid and an acid-releasing compound as well as at least one dialdehyde to the separation layer of pre-crosslinked polyvinyl alcohol; and
    post-crosslinking of the separation layer.

17. A method as set forth in claim 16 wherein said starting solution contains crosslinking means and at least one dicarboxylic acid.

18. A method as set forth in claim 16 wherein said starting solution contains crosslinking means and a dicarboxylic acid without a double bond and a dicarboxylic acid with a double bond.

19. A method as set forth in claim 16 wherein said dialdehyde is glutaric dialdehyde.

20. A method as set forth in claim 19 wherein said solution for the post-crosslinking of the polyvinyl alcohol contains sulfuric acid.

* * * * *

UNITED STATES PATENT AND TRADEMARK OFFICE
CERTIFICATE OF CORRECTION

PATENT NO. : 8,256,626 B2  
APPLICATION NO. : 12/586236  
DATED : September 4, 2012  
INVENTOR(S) : Andreas Hübner et al.

Page 1 of 1

It is certified that error appears in the above-identified patent and that said Letters Patent is hereby corrected as shown below:

Title page:

Item (73) Assignee: "Souzer Chemtech GmbH" should be --Sulzer Chemtech GmbH--

Signed and Sealed this  
Sixth Day of November, 2012

David J. Kappos  
*Director of the United States Patent and Trademark Office*